(12) United States Patent
Golgiri et al.

(10) Patent No.: US 10,917,748 B2
(45) Date of Patent: Feb. 9, 2021

(54) MOBILE DEVICE TETHERING FOR VEHICLE SYSTEMS BASED ON VARIABLE TIME-OF-FLIGHT AND DEAD RECKONING

(71) Applicant: Ford Global Technologies, LLC, Dearborn, MI (US)

(72) Inventors: Hamid M. Golgiri, Dearborn, MI (US); Aaron Matthew DeLong, Toledo, OH (US); Vivekanandh Elangovan, Canton, MI (US); Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 471 days.

(21) Appl. No.: 15/880,192

(22) Filed: Jan. 25, 2018

(65) Prior Publication Data

US 2019/0230471 A1 Jul. 25, 2019

(51) Int. Cl.
*H04W 4/02* (2018.01)
*G07C 9/00* (2020.01)
(Continued)

(52) U.S. Cl.
CPC ............... *H04W 4/025* (2013.01); *G01S 5/00* (2013.01); *G07C 9/00309* (2013.01);
(Continued)

(58) Field of Classification Search
CPC ......... H04W 4/025; H04W 4/40; H04W 4/03; H04W 64/003; H04W 4/023; G01S 5/00;
(Continued)

(56) References Cited

U.S. PATENT DOCUMENTS 5,959,724 A 9/1999 Izumi
6,246,955 B1 * 6/2001 Nishikawa ............. G08G 1/093
701/117
(Continued)

FOREIGN PATENT DOCUMENTS

CN 101929921 A 12/2010
CN 103818204 A 5/2014
(Continued)

OTHER PUBLICATIONS

Al-Sherbaz, Ali et al., Hybridisation of GNSS with other wireless/sensors technologies onboard smartphones to offer seamless outdoors-indoors positioning for LBS applications, Apr. 2016, 3 pages.
(Continued)

*Primary Examiner* — Paula L Schneider
(74) *Attorney, Agent, or Firm* — Frank Lollo; Eversheds Sutherland (US) LLP

(57) ABSTRACT

Method and apparatus are disclosed for mobile device tethering for vehicle systems based on variable time-of-flight and dead reckoning. An example vehicle includes a communication module to communicate with a mobile device using multiple frequency bands and a body control module. The body control module at an interval, estimates a location of the mobile device relative to the vehicle based on time-of-flight measurements using one of the multiple frequency bands selected based on a previous location estimate. Between the intervals, the body control module tracks the location of the mobile device using dead reckoning. Additionally, the body control system controls a subsystem of the vehicle based on the location of the mobile device.

17 Claims, 8 Drawing Sheets

(51) Int. Cl.
  *H04W 4/40* (2018.01)
  *G01S 5/00* (2006.01)
  *H04W 64/00* (2009.01)
  *H04L 29/08* (2006.01)

(52) U.S. Cl.
  CPC .... *H04W 4/40* (2018.02); *G07C 2009/00333* (2013.01); *G07C 2009/00341* (2013.01); *G07C 2009/00357* (2013.01); *G07C 2009/00507* (2013.01); *G07C 2209/63* (2013.01); *H04L 67/12* (2013.01); *H04W 4/023* (2013.01); *H04W 64/003* (2013.01)

(58) Field of Classification Search
  CPC ...... G07C 9/00309; G07C 2009/00333; G07C 2009/00341; G07C 2009/00357; G07C 2009/00507; G07C 2209/63; H04L 67/12
  USPC .......................................................... 701/2
  See application file for complete search history.

(56) References Cited

U.S. PATENT DOCUMENTS

| | | |
|---|---|---|
| 6,275,754 B1 | 8/2001 | Shimizu |
| 6,356,828 B1 | 3/2002 | Shimizu |
| 6,452,617 B1 | 9/2002 | Bates |
| 6,476,730 B2 | 11/2002 | Kakinami |
| 6,477,260 B1 | 11/2002 | Shimomura |
| 6,657,555 B2 | 12/2003 | Shimizu |
| 6,683,539 B2 | 1/2004 | Trajkovic |
| 6,724,322 B2 | 4/2004 | Tang |
| 6,744,364 B2 | 6/2004 | Wathen |
| 6,768,420 B2 | 7/2004 | McCarthy |
| 6,801,855 B1 | 10/2004 | Walters |
| 6,850,844 B1 | 1/2005 | Walters |
| 6,850,148 B2 | 2/2005 | Masudaya |
| 6,927,685 B2 | 8/2005 | Wathen |
| 6,997,048 B2 | 2/2006 | Komatsu |
| 7,042,332 B2 | 5/2006 | Takamura |
| 7,123,167 B2 | 10/2006 | Staniszewski |
| 7,307,655 B1 | 12/2007 | Okamoto |
| 7,663,508 B2 | 2/2010 | Teshima |
| 7,737,866 B2 | 6/2010 | Wu |
| 7,813,844 B2 | 10/2010 | Gensler |
| 7,825,828 B2 | 11/2010 | Watanabe |
| 7,834,778 B2 | 11/2010 | Browne |
| 7,847,709 B2 | 12/2010 | McCall |
| 7,850,078 B2 | 12/2010 | Christenson |
| 7,924,483 B2 | 4/2011 | Smith |
| 8,035,503 B2 | 10/2011 | Partin |
| 8,054,169 B2 | 11/2011 | Bettecken |
| 8,098,146 B2 | 1/2012 | Petrucelli |
| 8,126,450 B2 | 2/2012 | Howarter |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter |
| 8,229,645 B2 | 7/2012 | Lee |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,552,856 B2 | 10/2013 | McRae |
| 8,587,681 B2 | 11/2013 | Guidash |
| 8,594,616 B2 | 11/2013 | Gusikhin |
| 8,599,043 B2 | 12/2013 | Kadowaki |
| 8,618,945 B2 | 12/2013 | Furuta |
| 8,645,015 B2 | 2/2014 | Oetiker |
| 8,655,551 B2 | 2/2014 | Danz |
| 8,692,773 B2 | 4/2014 | You |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,787,868 B2 | 7/2014 | Leblanc |
| 8,825,262 B2 | 9/2014 | Lee |
| 8,933,778 B2 | 1/2015 | Birkel |
| 8,957,786 B2 | 2/2015 | Stempnik |
| 8,994,548 B2 | 3/2015 | Gaboury |
| 8,995,914 B2 | 3/2015 | Nishidai |
| 9,008,860 B2 | 4/2015 | Waldock |
| 9,014,920 B1 | 4/2015 | Torres |
| 9,078,200 B2 | 7/2015 | Wuergler |
| 9,086,879 B2 | 7/2015 | Gautama |
| 9,141,503 B1 | 9/2015 | Chen |
| 9,147,065 B2 | 9/2015 | Lauer |
| 9,154,920 B2 | 10/2015 | O'Brien et al. |
| 9,168,955 B2 | 10/2015 | Noh |
| 9,193,387 B2 | 11/2015 | Auer |
| 9,225,531 B2 | 12/2015 | Hachey |
| 9,230,439 B2 | 1/2016 | Boulay |
| 9,233,710 B2 | 1/2016 | Lavoie |
| 9,273,966 B2 | 3/2016 | Bartels |
| 9,275,208 B2 | 3/2016 | Protopapas |
| 9,283,960 B1 | 3/2016 | Lavoie |
| 9,286,803 B2 | 3/2016 | Tippelhofer |
| 9,302,675 B2 | 4/2016 | Schilling |
| 9,318,022 B2 | 4/2016 | Barth |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,454,251 B1 | 9/2016 | Guihot |
| 9,469,247 B2 | 10/2016 | Juneja |
| 9,493,187 B2 | 11/2016 | Pilutti |
| 9,506,774 B2 | 11/2016 | Shutko |
| 9,511,799 B2 | 12/2016 | Lavoie |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman et al. |
| 9,656,690 B2 | 5/2017 | Shen |
| 9,666,040 B2 | 5/2017 | Flaherty |
| 9,688,306 B2 | 6/2017 | McClain |
| 9,701,280 B2 | 7/2017 | Schussmann |
| 9,712,977 B2 | 7/2017 | Tu |
| 9,715,816 B1 | 7/2017 | Adler |
| 9,725,069 B2 | 8/2017 | Krishnan |
| 9,731,714 B2 | 8/2017 | Kiriya |
| 9,731,764 B2 | 8/2017 | Baek |
| 9,754,173 B2 | 9/2017 | Kim |
| 9,809,218 B2 | 11/2017 | Elie |
| 9,811,085 B1 | 11/2017 | Hayes |
| 9,842,444 B2 | 12/2017 | Van Wiemeersch |
| 9,845,070 B2 | 12/2017 | Petel |
| 9,846,431 B2 | 12/2017 | Petel |
| 9,914,333 B2 | 3/2018 | Shank |
| 9,921,743 B2 | 3/2018 | Bryant |
| 9,946,255 B2 | 4/2018 | Matters |
| 9,959,763 B2 | 5/2018 | Miller |
| 9,971,130 B1 | 5/2018 | Lin |
| 9,975,504 B2 | 5/2018 | Dalke |
| 10,019,001 B2 | 7/2018 | Dang Van Nhan |
| 10,032,276 B1 | 7/2018 | Liu |
| 10,040,482 B1 | 8/2018 | Jung |
| 10,043,076 B1 | 8/2018 | Zhang |
| 10,131,347 B2 | 11/2018 | Kim |
| 10,192,113 B1 | 1/2019 | Liu |
| 10,246,055 B2 | 4/2019 | Farges |
| 10,268,341 B2 | 4/2019 | Kocienda |
| 2003/0060972 A1 | 3/2003 | Kakinami |
| 2003/0098792 A1 | 5/2003 | Edwards |
| 2003/0133027 A1 | 7/2003 | Itoh |
| 2005/0030156 A1 | 2/2005 | Alfonso |
| 2005/0068450 A1 | 3/2005 | Steinberg |

(56) References Cited

U.S. PATENT DOCUMENTS

| | | |
|---|---|---|
| 2005/0099275 A1 | 5/2005 | Kamdar |
| 2006/0010961 A1 | 1/2006 | Gibson |
| 2006/0227010 A1 | 10/2006 | Berstis |
| 2006/0235590 A1 | 10/2006 | Bolourchi |
| 2007/0230944 A1 | 10/2007 | Georgiev |
| 2008/0027591 A1 | 1/2008 | Lenser |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 | 12/2008 | Ando |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |
| 2009/0128315 A1 | 5/2009 | Griesser |
| 2009/0146813 A1 | 6/2009 | Nuno |
| 2009/0174574 A1 | 7/2009 | Endo |
| 2009/0241031 A1 | 9/2009 | Gamaley |
| 2009/0289813 A1 | 11/2009 | Kwiecinski |
| 2009/0309970 A1 | 12/2009 | Ishii |
| 2009/0313095 A1 | 12/2009 | Hurpin |
| 2010/0025942 A1 | 2/2010 | Mangaroo |
| 2010/0061564 A1 | 3/2010 | Clemow |
| 2010/0114471 A1 | 5/2010 | Sugiyama |
| 2010/0114488 A1 | 5/2010 | Khamharn |
| 2010/0136944 A1 | 6/2010 | Taylor |
| 2010/0152972 A1 | 6/2010 | Attard |
| 2010/0156672 A1 | 6/2010 | Yoo |
| 2010/0171642 A1* | 7/2010 | Hassan .......... G01S 13/825 340/992 |
| 2010/0245277 A1 | 9/2010 | Nakao |
| 2010/0259420 A1 | 10/2010 | Von Rehyer |
| 2011/0071725 A1 | 3/2011 | Kleve |
| 2011/0082613 A1 | 4/2011 | Oetiker |
| 2011/0190972 A1 | 8/2011 | Timmons |
| 2011/0205088 A1 | 8/2011 | Baker |
| 2011/0253463 A1 | 10/2011 | Smith |
| 2011/0309922 A1 | 12/2011 | Ghabra |
| 2012/0007741 A1 | 1/2012 | Laffey |
| 2012/0072067 A1 | 3/2012 | Jecker |
| 2012/0083960 A1 | 4/2012 | Zhu |
| 2012/0173080 A1 | 7/2012 | Cluff |
| 2012/0176332 A1 | 7/2012 | Fujibayashi |
| 2012/0271500 A1 | 10/2012 | Tsimhoni |
| 2012/0303258 A1 | 11/2012 | Pampus |
| 2012/0323643 A1 | 12/2012 | Volz |
| 2012/0323700 A1 | 12/2012 | Aleksandrovich |
| 2013/0021171 A1 | 1/2013 | Hsu |
| 2013/0024202 A1 | 1/2013 | Harris |
| 2013/0043989 A1 | 2/2013 | Niemz |
| 2013/0073119 A1 | 3/2013 | Huger |
| 2013/0109342 A1 | 5/2013 | Welch |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar |
| 2013/0211623 A1 | 8/2013 | Thompson |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang et al. |
| 2014/0052323 A1 | 2/2014 | Reichel |
| 2014/0095994 A1 | 4/2014 | Kim |
| 2014/0096051 A1 | 4/2014 | Boblett |
| 2014/0121930 A1 | 5/2014 | Allexi |
| 2014/0147032 A1 | 5/2014 | Yous |
| 2014/0156107 A1 | 6/2014 | Karasawa |
| 2014/0188339 A1 | 7/2014 | Moon |
| 2014/0222252 A1 | 8/2014 | Matters |
| 2014/0240502 A1 | 8/2014 | Strauss |
| 2014/0282931 A1 | 9/2014 | Protopapas |
| 2014/0297120 A1 | 10/2014 | Cotgrove |
| 2014/0300504 A1 | 10/2014 | Shaffer |
| 2014/0303839 A1 | 10/2014 | Filev |
| 2014/0320318 A1 | 10/2014 | Victor |
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1 | 12/2014 | You |
| 2014/0365126 A1 | 12/2014 | Vulcano |
| 2015/0022468 A1 | 1/2015 | Cha |
| 2015/0039173 A1 | 2/2015 | Beaurepaire |
| 2015/0039224 A1 | 2/2015 | Tuukkanen |
| 2015/0048927 A1 | 2/2015 | Simmons |
| 2015/0066545 A1 | 3/2015 | Kotecha |
| 2015/0077522 A1 | 3/2015 | Suzuki |
| 2015/0088360 A1 | 3/2015 | Bonnet |
| 2015/0091741 A1 | 4/2015 | Stefik |
| 2015/0109116 A1 | 4/2015 | Grimm |
| 2015/0116079 A1 | 4/2015 | Mishra |
| 2015/0123818 A1 | 5/2015 | Sellschopp |
| 2015/0127208 A1 | 5/2015 | Jecker |
| 2015/0149265 A1 | 5/2015 | Huntzicker |
| 2015/0151789 A1 | 6/2015 | Lee |
| 2015/0153178 A1 | 6/2015 | Koo |
| 2015/0161890 A1 | 6/2015 | Huntzicker |
| 2015/0163649 A1 | 6/2015 | Chen |
| 2015/0197278 A1 | 7/2015 | Boos |
| 2015/0203111 A1 | 7/2015 | Bonnet |
| 2015/0203156 A1 | 7/2015 | Hafner |
| 2015/0210317 A1 | 7/2015 | Hafner |
| 2015/0217693 A1 | 8/2015 | Pliefke |
| 2015/0219464 A1 | 8/2015 | Beaurepaire |
| 2015/0220791 A1 | 8/2015 | Wu |
| 2015/0226146 A1 | 8/2015 | Elwart |
| 2015/0274016 A1 | 10/2015 | Kinoshita |
| 2015/0286340 A1 | 10/2015 | Send |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0365401 A1 | 12/2015 | Brown |
| 2015/0371541 A1 | 12/2015 | Korman |
| 2015/0375741 A1 | 12/2015 | Kiriya |
| 2015/0375742 A1 | 12/2015 | Gebert |
| 2016/0012653 A1 | 1/2016 | Soroka |
| 2016/0012726 A1 | 1/2016 | Wang |
| 2016/0018821 A1 | 1/2016 | Akita |
| 2016/0055749 A1 | 2/2016 | Nicoll |
| 2016/0153778 A1 | 2/2016 | Singh |
| 2016/0062354 A1 | 3/2016 | Li |
| 2016/0068158 A1 | 3/2016 | Elwart |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1 | 5/2016 | Oshima |
| 2016/0152263 A1 | 6/2016 | Singh |
| 2016/0170494 A1 | 6/2016 | Bonnet |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0224025 A1 | 8/2016 | Petel |
| 2016/0229452 A1 | 8/2016 | Lavoie |
| 2016/0236680 A1 | 8/2016 | Lavoie |
| 2016/0249294 A1 | 8/2016 | Lee |
| 2016/0257304 A1 | 9/2016 | Lavoie |
| 2016/0272244 A1 | 9/2016 | Imai |
| 2016/0282442 A1 | 9/2016 | O'Mahony et al. |
| 2016/0284217 A1 | 9/2016 | Lee |
| 2016/0288657 A1 | 10/2016 | Tokura |
| 2016/0300417 A1 | 10/2016 | Hatton |
| 2016/0304087 A1 | 10/2016 | Noh |
| 2016/0304088 A1 | 10/2016 | Barth |
| 2016/0321445 A1 | 11/2016 | Turgeman |
| 2016/0321926 A1 | 11/2016 | Mayer |
| 2016/0334797 A1 | 11/2016 | Ross |
| 2016/0347280 A1 | 12/2016 | Daman |

(56) References Cited

U.S. PATENT DOCUMENTS

| | | |
|---|---|---|
| 2016/0349362 A1 | 12/2016 | Rohr et al. |
| 2016/0355125 A1 | 12/2016 | Herbert |
| 2016/0357354 A1 | 12/2016 | Chen |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang |
| 2017/0001650 A1 | 1/2017 | Park |
| 2017/0008563 A1 | 1/2017 | Popken |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0097504 A1 | 4/2017 | Takamatsu |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0200369 A1 | 7/2017 | Miller |
| 2017/0203763 A1 | 7/2017 | Yamada |
| 2017/0208438 A1 | 7/2017 | Dickow |
| 2017/0297385 A1 | 10/2017 | Kim |
| 2017/0297620 A1 | 10/2017 | Lavoie |
| 2017/0301241 A1 | 10/2017 | Urhahne |
| 2017/0308075 A1 | 10/2017 | Whitaker |
| 2017/0336788 A1 | 11/2017 | Iagnemma |
| 2017/0357317 A1 | 12/2017 | Chaudhri |
| 2017/0371514 A1 | 12/2017 | Cullin |
| 2018/0015878 A1 | 1/2018 | McNew |
| 2018/0024559 A1 | 1/2018 | Seo |
| 2018/0029591 A1 | 2/2018 | Lavoie |
| 2018/0029641 A1 | 2/2018 | Solar |
| 2018/0039264 A1 | 2/2018 | Messner |
| 2018/0043884 A1 | 2/2018 | Johnson |
| 2018/0056939 A1 | 3/2018 | van Roermund |
| 2018/0056989 A1 | 3/2018 | Donald |
| 2018/0082588 A1 | 3/2018 | Hoffman, Jr. |
| 2018/0088330 A1 | 3/2018 | Giannuzzi |
| 2018/0091949 A1* | 3/2018 | Steiner .................. G01S 5/0263 |
| 2018/0093663 A1 | 4/2018 | Kim |
| 2018/0105165 A1 | 4/2018 | Alarcon |
| 2018/0105167 A1 | 4/2018 | Kim |
| 2018/0148094 A1 | 5/2018 | Mukaiyama |
| 2018/0174460 A1 | 6/2018 | Jung |
| 2018/0189971 A1 | 7/2018 | Hildreth |
| 2018/0194344 A1 | 7/2018 | Wang |
| 2018/0196963 A1 | 7/2018 | Bandiwdekar |
| 2018/0224863 A1 | 8/2018 | Fu |
| 2018/0236957 A1 | 8/2018 | Min |
| 2018/0284802 A1 | 10/2018 | Tsai |
| 2018/0286072 A1 | 10/2018 | Tsai |
| 2018/0339654 A1 | 11/2018 | Kim |
| 2018/0345851 A1 | 12/2018 | Lavoie |
| 2018/0364731 A1 | 12/2018 | Liu |
| 2019/0005445 A1 | 1/2019 | Bahrainwala |
| 2019/0042003 A1 | 2/2019 | Parazynski |
| 2019/0066503 A1 | 2/2019 | Li |
| 2019/0103027 A1 | 4/2019 | Wheeler |
| 2019/0137990 A1 | 5/2019 | Golgiri |
| 2019/0263358 A1* | 8/2019 | Kusumoto ............... B60R 25/24 |
| 2019/0297462 A1* | 9/2019 | Aljadeff ................. B64C 39/024 |

FOREIGN PATENT DOCUMENTS

| | | |
|---|---|---|
| CN | 104183153 A | 12/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009024083 A1 | 7/2010 |
| DE | 102016224529 A1 | 3/2011 |
| DE | 102016226008 A1 | 3/2011 |
| DE | 102009060169 A1 | 6/2013 |
| DE | 102011080148 A1 | 7/2013 |
| DE | 102012200725 A1 | 9/2013 |
| DE | 102009051055 A1 | 10/2013 |
| DE | 102010034129 B4 | 10/2013 |
| DE | 102011122421 A1 | 6/2014 |
| DE | 102012008858 A1 | 6/2014 |
| DE | 102013016342 A1 | 1/2015 |
| DE | 102013019904 A1 | 2/2015 |
| DE | 102012215218 A1 | 4/2015 |
| DE | 102012222972 A1 | 5/2015 |
| DE | 102013004214 A1 | 5/2015 |
| DE | 102014007915 A1 | 12/2015 |
| DE | 102013213064 A1 | 2/2016 |
| DE | 102014007915 A1 | 2/2016 |
| DE | 102014111570 A1 | 2/2016 |
| DE | 102014015655 A1 | 4/2016 |
| DE | 102014226458 A1 | 6/2016 |
| DE | 102014011864 A1 | 12/2016 |
| DE | 102014015655 A1 | 5/2017 |
| DE | 102014111570 A1 | 6/2017 |
| DE | 102016214433 A1 | 6/2017 |
| DE | 102015209976 A1 | 7/2017 |
| DE | 102015221224 A1 | 12/2017 |
| DE | 102016011916 A1 | 2/2018 |
| DE | 102016125282 A1 | 6/2018 |
| DE | 102016211021 A1 | 6/2018 |
| EP | 2653367 A1 | 6/2000 |
| EP | 2289768 A2 | 10/2013 |
| EP | 2620351 B1 | 12/2015 |
| EP | 2295281 A1 | 3/2016 |
| EP | 2135788 B1 | 6/2016 |
| FR | 3021798 A1 | 12/2012 |
| GB | 2534471 A | 10/2000 |
| GB | 2344481 A | 12/2012 |
| GB | 2497836 A | 9/2014 |
| GB | 2481324 A | 3/2015 |
| GB | 2517835 A | 5/2016 |
| GB | 2491720 A | 7/2016 |
| JP | 2004142543 A | 5/2004 |
| JP | 5918683 B2 | 10/2004 |
| JP | 2000293797 A | 7/2005 |
| JP | 2004142543 A | 4/2009 |
| JP | 2016119032 A | 4/2009 |
| JP | 2018052188 A | 1/2010 |
| JP | 2004287884 A | 7/2014 |
| JP | 2014134082 A | 7/2014 |
| JP | 2014125196 A | 4/2018 |
| JP | 2009090850 A | 6/2016 |
| JP | 2014134082 A | 7/2016 |
| JP | 2014125196 A | 4/2018 |
| KR | 20130106005 A | 6/2006 |
| KR | 20160039460 A | 5/2008 |
| KR | 20160051993 A | 1/2010 |
| KR | 101641267 B | 9/2013 |
| KR | 20090040024 A | 4/2016 |
| KR | 20100006714 A | 5/2016 |
| WO | WO 2017/112444 A1 | 12/2010 |
| WO | WO 2017/118510 A1 | 6/2011 |
| WO | WO 2006/064544 A1 | 11/2011 |
| WO | WO 2017/125514 A1 | 1/2013 |

(56) References Cited

FOREIGN PATENT DOCUMENTS

| WO | WO 2008/055567 A1 | 4/2013 |
|---|---|---|
| WO | WO 2010/006981 A1 | 8/2013 |
| WO | WO 2011/141096 A1 | 7/2014 |
| WO | WO 2015/068032 A1 | 5/2015 |
| WO | WO 2013/123813 A1 | 12/2015 |
| WO | WO 2016/046269 A1 | 3/2016 |
| WO | WO 2015/068032 A1 | 8/2016 |
| WO | WO 2015/193058 A1 | 9/2016 |
| WO | WO 2016/046269 A1 | 4/2017 |
| WO | WO 2016/128200 A1 | 5/2017 |
| WO | WO 2016/134822 A1 | 6/2017 |
| WO | WO 2017/062448 A1 | 6/2017 |
| WO | WO 2017/073159 A1 | 6/2017 |
| WO | WO 2017/096307 A1 | 6/2017 |
| WO | WO 2017/096728 A1 | 7/2017 |
| WO | WO 2017/097942 A1 | 7/2017 |

OTHER PUBLICATIONS

Jingbin Liu, IParking: An Intelligent Indoor Location-Based Smartphone Parking Service, Oct. 31, 2012, 15 pages.
Alberto Broggi and Elena Cardarelli, Vehicle Detection for Autonomous Parking Using a Soft-Cascade ADA Boost Classifier, Jun. 8, 2014.
Automatically Into the Parking Space—https://www.mercedes-benz.com/en/mercedes-benz/next/automation/automatically-into-the-parking-space/; Oct. 27, 2014.
Bill Howard, Bosch's View of the Future Car: Truly Keyless Entry, Haptic Feedback, Smart Parking, Cybersecurity, Jan. 9, 2017, 8 Pages.
ChargeItSpot Locations, Find a Phone Charging Station Near You, retrieved at https://chargeitspot.com/locations/ on Nov. 28, 2017.
Core System Requirements Specification Technology Administration (SyRS), Jun. 30, 2011, Research and Innovative Technology Administration.
Daimler AG, Remote Parking Pilot, Mar. 2016 (3 Pages).
Land Rover develops a smartphone remote control for its SUVs, James Vincent, Jun. 18, 2015.
Land Rover, Land Rover Remote Control Via Iphone RC Range Rover Sport Showcase —Autogefühl, Retrieved from https://www.youtube.com/watch?v=4ZaaYNaEFio (at 43 seconds and 1 minute 42 seconds), Sep. 16, 2015.
Perpendicular Parking—https://prezi.com/toqmfyxriksl/perpendicular-parking/.
SafeCharge, Secure Cell Phone Charging Stations & Lockers, retrieved at https://www.thesafecharge.com on Nov. 28, 2017.
Search Report dated Jan. 19, 2018 for GB Patent Application No. 1711988.4 (3 pages).
Search Report dated Jul. 11, 2017 for GB Patent Application No. 1700447.4 (3 Pages).
Search Report dated Nov. 22, 2018 for GB Patent Application No. GB 1809829.3 (6 pages).
Search Report dated Nov. 27, 2018 for GB Patent Application No. GB 1809112.4 (3 pages).
Search Report dated Nov. 28, 2017, for GB Patent Application No. GB 1710916.6 (4 Pages).
Search Report dated Nov. 28, 2018 for GB Patent Application No. GB 1809842.6 (5 pages).
Search Report dated Oct. 10, 2018 for GB Patent Application No. 1806499.8 (4 pages).
Tesla Model S Owner's Manual v2018.44. Oct. 29, 2018.
Vehicle's Orientation Measurement Method by Single-Camera Image Using Known-Shaped Planar Object, Nozomu Araki, Takao Sato, Yasuo Konishi and Hiroyuki Ishigaki, 2010.

\* cited by examiner

MOBILE DEVICE TETHERING FOR VEHICLE SYSTEMS BASED ON VARIABLE TIME-OF-FLIGHT AND DEAD RECKONING

RELATED APPLICATIONS

This application is related to U.S. application Ser. No. 15/880,202, entitled "Mobile Device Tethering for Vehicle Systems Based on Variable Time-of-Flight and Dead Reckoning," filed on Jan. 25, 2018, which is herein incorporated by reference in its entirety.

TECHNICAL FIELD

The present disclosure generally relates to vehicles with remotely activated systems and, more specifically, mobile device tethering for vehicle systems based on variable time-of-flight and dead reckoning.

BACKGROUND

Increasingly, vehicles are manufactured with systems that function based on a location of a mobile device relative to the location of the vehicle. These systems may include phone-as-a-key (PaaK) or key fob based passive entry passive start (PEPS) systems, remote park assist (RePA) systems, driver welcome systems, and relay attack mitigation systems, etc. For example, a RePA system may only autonomously park the vehicle when the key fob is within 6 meters of the vehicle or the PEPS system may only prime a door to unlock when the key fob is within 2 meters of the vehicle. However, the process of tracking the key fob (sometimes referred to as "localization") can require a relatively significant amount of battery power. Drivers are annoyed when their key fobs or mobile devices have battery issues due to passive features.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for mobile device tethering for vehicle systems based on variable time-of-flight and dead reckoning. An example vehicle includes a communication module to communicate with a mobile device using multiple frequency bands and a body control module. The body control module, at an interval, estimates a location of the mobile device relative to the vehicle based on time-of-flight measurements using one of the multiple frequency bands selected based on a previous location estimate. Between the intervals, the body control module tracks the location of the mobile device using dead reckoning. Additionally, the body control system controls a subsystem of the vehicle based on the location of the mobile device.

An example method to control a vehicle includes, at an interval, performing time-of-flight measurements of a signal between the vehicle and a mobile device using a frequency band selected based on a previous estimated location of the mobile device relative to the vehicle to obtain a fix on the mobile device. The example method also includes, between the intervals, based on the fix, performing dead reckoning on the mobile device using inertial sensor measurements received from the mobile device to estimate a current location of the mobile device. Additionally, the example method includes controlling a subsystem of the vehicle based on the estimated current location of the mobile device.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1A:
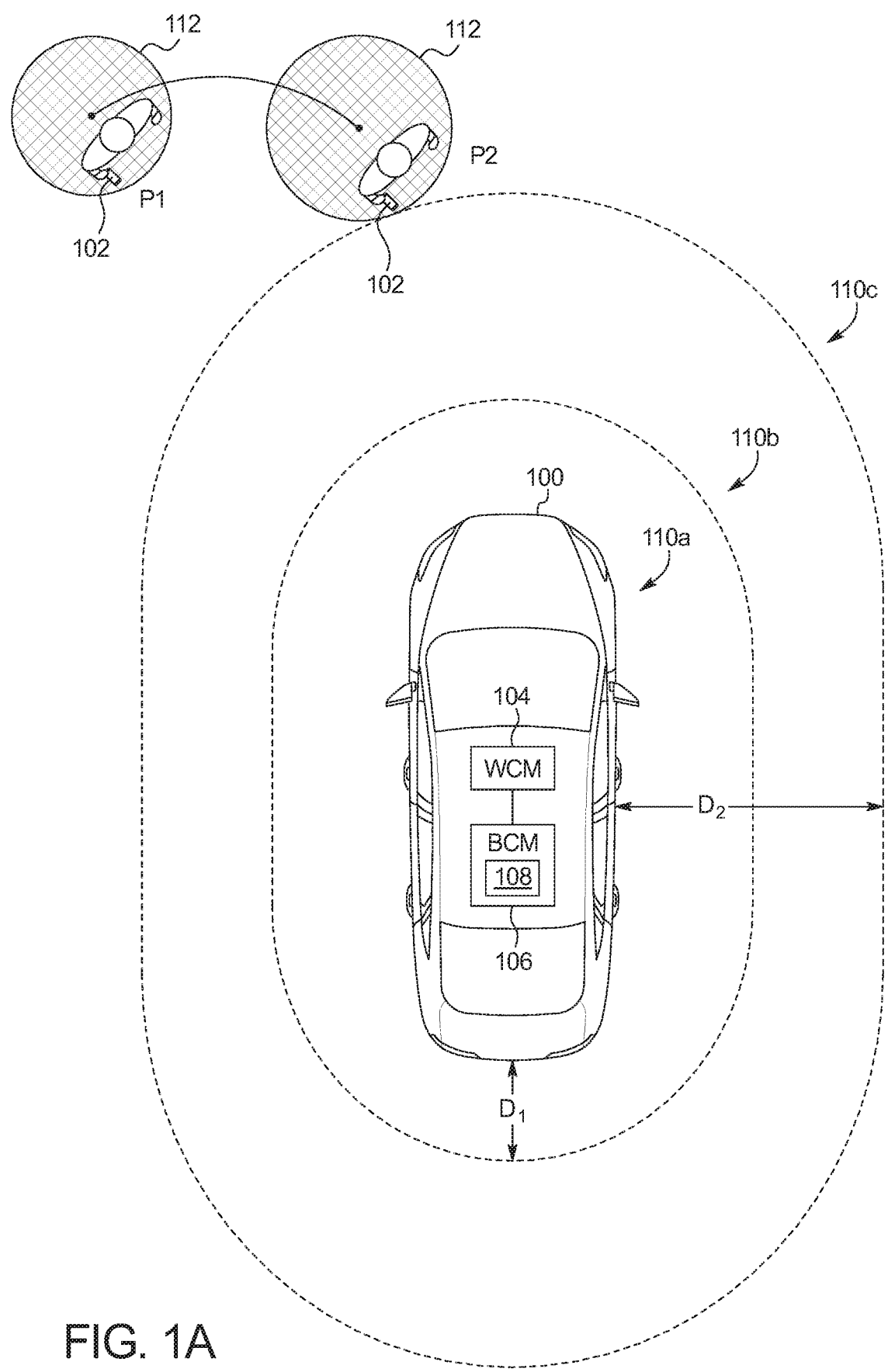
FIGS. 1A, 1B, and 1C illustrate a vehicle operating in a first vehicle mode.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Several vehicles systems operate based on using a location of a mobile device (e.g., smart phone, smart watch, key fob, etc.) as a proxy for a location of a vehicle operator. These vehicle systems activate different features based on the location of the operator. These vehicle systems include passive entry passive start (PEPS) systems, remote park assist (RePA) systems, driver welcome systems, and/or relay attack mitigation systems, etc. PEPS systems facilitate keyless entry and keyless ignition of the vehicle. The PEPS system (a) primes doors of the vehicle to unlock (e.g., prepares to unlock the door in response to detecting the operator touching the door handle, etc.) when the operator crosses a threshold distance (e.g., 2 meters, etc.) associated with keyless entry and (b) activates keyless ignition (e.g., via a push button start, etc.) when the operator is inside the vehicle. RePA systems autonomously park the vehicle into a parking space when the operator is within a threshold distance of the vehicle (e.g., 6 meters, etc.). Driver welcome systems prepare a cabin of the vehicle for the operator when the operator crosses into a threshold distance of the vehicle (e.g., 4 meters, etc.). For example, the driver welcome system may illuminate cabin lights and/or adjust positions of seats, steering columns, and/or pedals, etc.

As discussed below, a vehicle performs localization on a mobile device using frequency variant time-of-flight measurements supplemented with dead reckoning. Time-of-flight (ToF) is a localization technique that determines a location of a first wireless device (e.g., the mobile device) based on a transit time of a signal between the first wireless device and a second wireless device (e.g., the vehicle). The vehicle sends a request (REQ) signal and measures a time to receive an acknowledgement (ACK) signal from the mobile device. The accuracy of the ToF measurement is based on the frequency of the REQ and ACK signals. Higher frequencies, which tend to have higher signal bandwidth, produce more accurate measurements than lower frequencies, which tend to have low signal bandwidth. However, higher frequencies require more power to operate at longer distances. Dead reckoning is a technique that uses measurements of inertial sensors (e.g., accelerometers, gyroscopes, etc.) in the mobile device to determine the current location of the mobile device based on an initial location (sometimes referred to as a "fix"). As the mobile device moves, the vehicle tracks the movement by tracking the distance and direction the mobile device has traveled relative to the initial location. However, as the mobile device moves, more and more inaccuracy is introduced into the measurement. From time-to-time, the vehicle reestablishes the fix.

As described herein, the vehicle establishes a fix of the mobile device using ToF. Because of the error in the measurement, the vehicle determines a zone of probability that encompasses the possible locations of the mobile device taking into account the measurement error. The mobile device and the vehicle are configured with multiple wireless controllers (e.g., radios, antennas, etc.) to communicate using multiple discrete frequency bands. The frequency of the ToF signals is based on the location of the mobile device in relation to the vehicle. Generally, as the mobile device moves closer to the vehicle, the precision of tracking the mobile device increases and, as the mobile device move farther away from the vehicle, the precision of tracking the mobile device decreases. In some examples, the vehicle establishes multiple proximity zones around the vehicle based on distance thresholds. When the zone of probability crosses into a proximity zone, the vehicle changes which frequency band it uses for the ToF signals. As the mobile device (e.g., the associated zone of probability) crosses into proximity zones and becomes closer to the vehicle, the vehicle uses the frequency bands that have a higher center frequency. Conversely, as the mobile device (e.g., the associated zone of probability) crosses into proximity zones and becomes farther from the vehicle, the vehicle uses the frequency bands that have a lower center frequency. In some examples, the vehicle selects from a 2.4 gigahertz (GHz) band, a 5.0 GHz bands, and a 60.0 GHz band. For example, the vehicle may use the 2.4 GHz band when the zone of probability associated with the mobile device is greater than 6 meters from the vehicle, the 5.0 GHz band when the zone of probability associated with the mobile device is between 6 meters and 2 meters from the vehicle, and 60.0 GHz bands when the zone of probability associated with the mobile device is less than 2 meters from the vehicle. As a result, because frequencies with larger available bandwidths produce more accurate ToF measurements, the zone of probability shrinks as the mobile device moves closer to the vehicle. In some examples, the vehicle selects the locations of the proximity zones and the frequency bands associated with the proximity zones as a function of the modes (e.g., RePA, PEPS, etc.) that the vehicle is currently operating. For example, when the RePA system, but not the PEPS system, is engaged, the proximity zones and the associated frequency bands may be changes to prioritize power savings over accuracy. That is, in such examples, there may be fewer proximity zones with lower frequency bands used in those proximity zones. Additionally, in some examples, the highest precision frequency band is used to determine whether the mobile device is inside or outside localization.

In some examples, the interval at which the vehicle establishes the fix using ToF measurements is based on which proximity zone that the zone of probability associated with the mobile is in. For example, when the zone of probability associated with the mobile is greater than 6 meters, the vehicle may send ToF signals to obtain a fix on the vehicle every 30 seconds. Between fixes, the vehicle uses dead reckoning to track the location of the zone of probability of the mobile device. To use dead reckoning, the vehicle receives measurements from the inertial sensor(s) of the mobile device. In some examples, the frequency band used to communicate the measurements from the inertial sensor can be different from the frequency band used for the ToF measurement. For example, because of the location of the zone of probability is within 2 meters of the vehicle, the vehicle may use the 60.0 GHz frequency band for the ToF measurement and use Bluetooth® (e.g., on the 2.4 GHz band) to communicate with the inertial sensor measurements regardless of the distance between the mobile device and the vehicle. In such a manner, the vehicle can track the location of the mobile device to an acceptable degree of accuracy while conserving power of the mobile device.

Figure 1B:
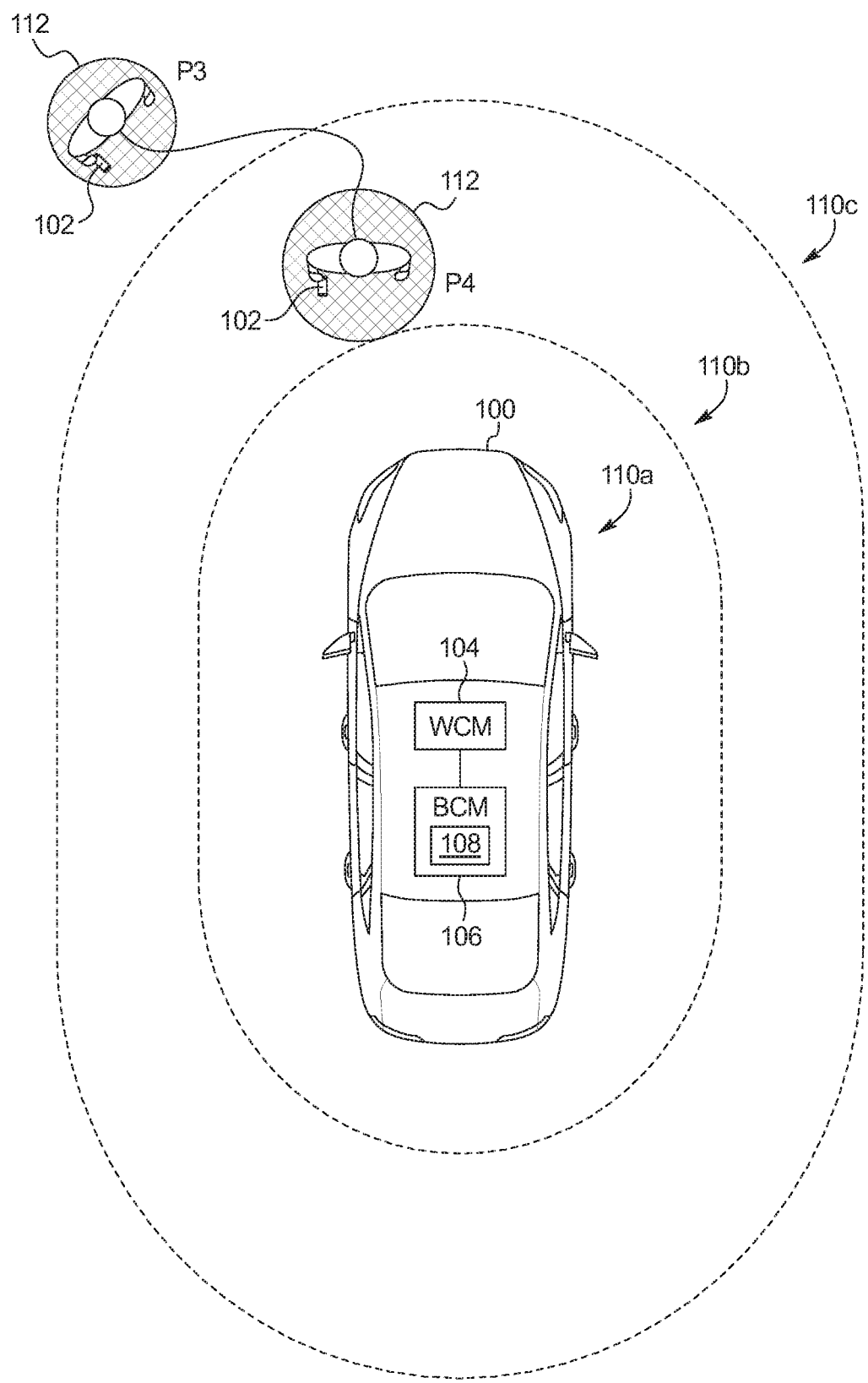
Figure 1C:
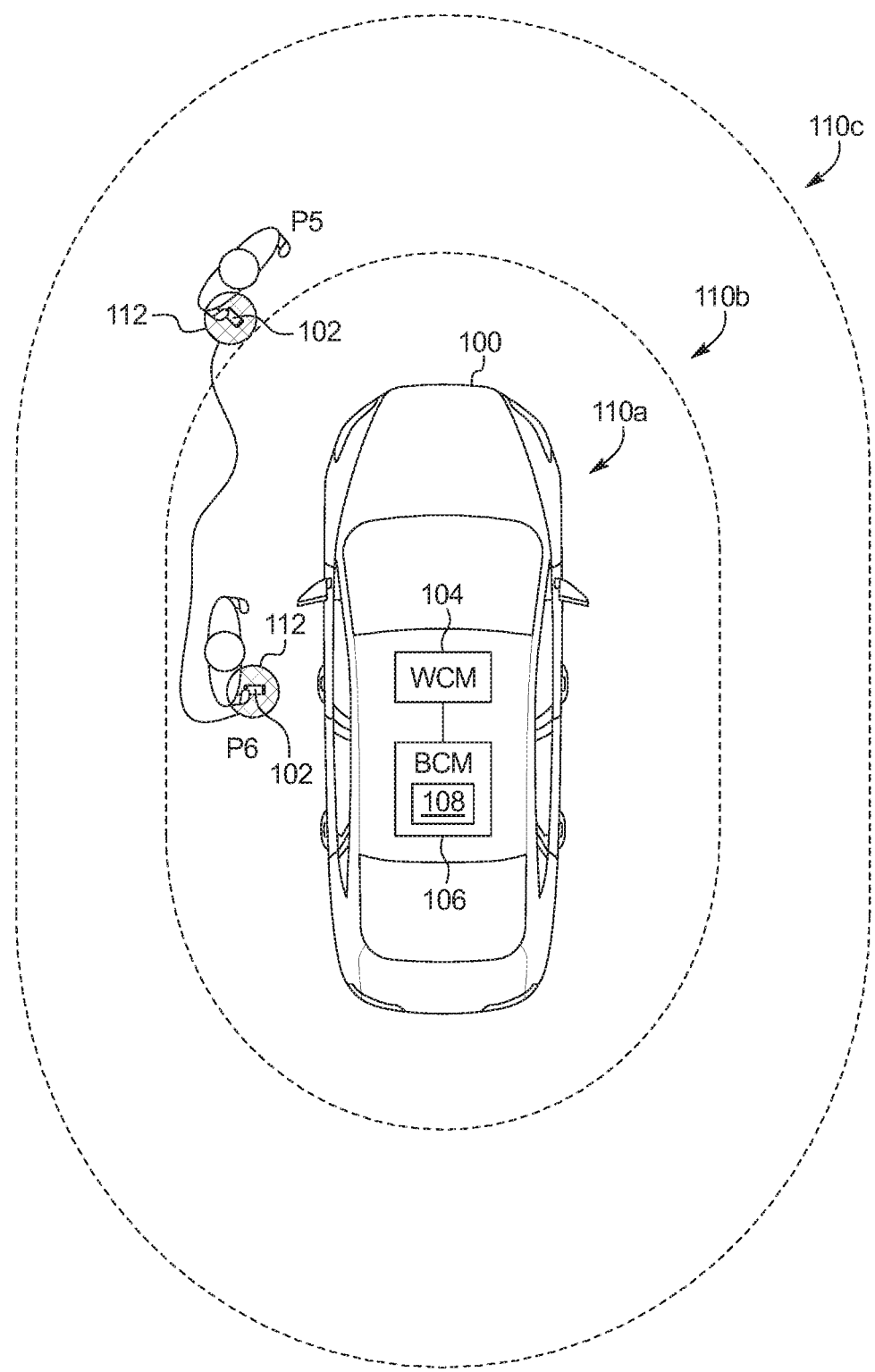

FIGS. 1A, 1B, and 1C illustrate a vehicle 100 and a mobile device 102 operating in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated examples, the vehicle 100 includes a wireless control module (WCM) 104 and a body control module 106. In some examples, the vehicle 100 also includes an autonomy unit (not shown) that controls the RePA system and other autonomous features (e.g., such as autopilot, adaptive cruise control, lane keep assist, etc.).

The wireless control module 104 includes multiple communication controllers that include hardware (e.g., processors, memory, storage, antenna, etc.) and software to communicate over different discrete bands. In some examples, the wireless control module 104 includes communication controllers to communicate over the 2.4 GHz frequency band, the 5.0 GHz frequency band, and the 60.0 GHz frequency band. The communications controllers operate different standard-based networks. For example, the communication controller for the 2.4 GHz frequency band may use the Bluetooth®, Bluetooth® Low Energy, Zigbee®, and/or one of the Wi-Fi® protocols (e.g., IEEE 802.11b, 802.11g, and/or 802.11n, etc), the communication controller for the 5.0 GHz frequency band may use one of the Wi-Fi® protocols (e.g., IEEE 802.11n and/or 802.11ac, etc.), and the communication controller for the 60.0 GHz frequency band may use one of the Wi-Fi® protocols (e.g., IEEE 802.11ad) or WirelessHD (the WirelessHD Specification Version 1.1 as subsequently amended, maintained by the WirelessHD Consortium). In some examples, one of the communication controllers communicated using more than one frequency band. For example, a communication controller implementing the IEEE 802.11n Wi-Fi® protocol may be able to communicate using the 2.4 GHz frequency band and the 5.0

GHz frequency band. In some examples, the wireless control module 104 includes other communication controllers that operate at other frequencies bands. For example, the wireless control module 104 may include a communication controller that operates at the 900 megahertz frequency band. In such an example, the communication controller may implement the Z-Wave® protocol.

The body control module 106 controls various subsystems of the vehicle 100. For example, the body control module 106 may control power windows, power locks, an immobilizer system, and/or power mirrors, etc. The body control module 106 is coupled to circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. In some examples, the body control module 106 includes the PEPS system. The PEPS system (a) unlocks a door when a hand of a person is detected (e.g., via a touch sensor, via an infrared sensor, etc.) on or proximate the handle of the door when the mobile device is within a threshold distance (e.g., 2 meters, etc.) of the vehicle 100, and/or (b) disengages the immobilizer and starts the engine without a key in an ignition (e.g., by pressing an ignition button, etc.) when the mobile device 102 is inside the vehicle 100. In some examples, the PEPS system also includes a welcome mode that illuminates lights inside and outside the cabin of the vehicle 100 and/or changes settings of various systems within the cabin (e.g., the position and/or angle of the driver's seat, the position and/or angle of the steering column, the position of the pedals, radio presets, etc) when the mobile device 102 is within a different threshold distance (e.g., 3 meters, etc.) of the vehicle 100.

In the illustrated examples, the body control module 106 includes a device tracker 108. The device tracker 108 estimates the location of the mobile device 102 and provides that location to other systems of the vehicle 100 (such as the PEPS system and the RePA system, etc.). In the illustrated examples of FIGS. 1A, 1B, and 1C, the device tracker 108 establishes proximity zones 110a, 110b, and 110c. The device tracker 108 defines the proximity zones 110a, 110b, and 110c. In the illustrated examples, a first proximity zone 110a is defined as an area between the vehicle 100 and a first distance (D1), a second proximity zone 110b is defined as an area between first distance (D1) and a second distance (D2) from the vehicle 100, and a third proximity zone 110c is defined as an area farther than the second distance (D2) from the vehicle 100 In some examples, the distances (D1, D2) used to define the proximity zones 110a, 110b, and 110c are related to the distance thresholds for the various systems (e.g., the PEPS system, the RePA system, etc.) of the vehicle 100. For example, the first distance (D1) may be 2 meters corresponding with the threshold of the passive entry feature of the PEPS system and the second distance may be 6 meters corresponding with the threshold used by the RePA system. However, the distances (D1, D2) used to define the proximity zones 110a, 110b, and 110c may not correspond to the thresholds of the any of the systems of the vehicle 100. That is, the determination of whether the mobile device 102 is within a threshold distance of the vehicle 100 to activate a particular feature may be separate from the determination of which of the proximity zones 110a, 110b, and 110c the mobile device 102 is in.

To track the location of the mobile device 102, the device tracker 108 uses time-of-flight (ToF) measurements supplemented with dead reckoning. The device tracker 108 uses ToF measurements to acquire a fix on the location of the mobile device 102 from time-to-time and uses dead reckoning to track the location of the mobile device 102 between fixes. To perform a ToF measurement, the device tracker 108 sends, via the wireless control module 104, a request message (REQ) to the mobile device 102 and measures the time it takes to receive a corresponding acknowledgement message (ACK) from the mobile device 102. To send the REQ message, the device tracker 108 selects a frequency band to communicate with the mobile device based on which of the proximity zones 110a, 110b, and 110c that the mobile device 102 is estimated to be in. Generally, when the mobile device 102 is closer to the vehicle 100, the device tracker 108 selects a higher frequency band. In some examples, when the mobile device 102 is in the third proximity zone 110c, the device tracker 108 selects the 2.4 GHz frequency band. In some examples, when the mobile device 102 is in the second proximity zone 110b, the device tracker 108 selects the 5.0 GHz frequency band. Additionally, in some examples, when the mobile device 102 is in the first proximity zone 110a, the device tracker 108 selects the 60.0 GHz frequency band.

Alternatively, in some examples, the device tracker 108 assigns one frequency band to the outer most proximity zone 110c and the inner most proximity zone 110a and a different, more accurate, frequency band to the middle proximity zone 100b. For example, the device tracker 108 may want to determine with heightened accuracy when the mobile device 102 transitions from the middle proximity zone 110b to the outer most proximity zone 110c, but may be robust enough to tolerate greater inaccuracy when the mobile device 102 is in the outer most proximity zone 110c or the inner most proximity zone 110a. As such an example, when the RePA system is active, the device tracker 108 may establish the boundaries of the proximity zones 110a, 110b, and 110c such that the middle proximity zone 110b encompasses the area 5.5 meters to 6.0 meters from the vehicle 100 so that the device tracker 108 tracks with greater accuracy when the mobile device 102 is farther than 6.0 meters from the vehicle. In some examples, the device tracker 108 assigns a lower frequency band (e.g., 2.4 GHz or 5.0 GHz, etc.) to the outer most proximity zone 110c and the inner most proximity zone 110a and a higher frequency band (e.g., 5.0 GHz or 60.0 GHz, etc.) to the middle proximity zone 110b. Alternatively in some examples, the outer most proximity zone 110c and the inner most proximity zone 110a may not be assigned the same frequency. For example, the outer most proximity zone 110c may be assigned the 2.4 GHz frequency band, the middle proximity zone 110b may be assigned the 60.0 GHz frequency band, and the inner most proximity zone 110a may be assigned the 5.0 GHz frequency band.

In some examples, the mobile device 102 sends a message to the device tracker 108 indicating which function of the vehicle 100 (e.g., RePA, PEPS, etc.) is to be active. For example, the operator may press a button or select an interface on the mobile device 102 to switch between activating the PEPS system and activating the RePA system. In such examples, the device tracker 108 configures the proximity zones 110a, 110b, and 110c (e.g., changes the number of the proximity zones 110a, 110b, and 110c and/or the boundaries of the proximity zones 110a, 110b, and 110c, etc.) and the frequency bands assigned to the proximity zones 110a, 110b, and 110c in response to receiving the message from the mobile device. For example, in the PEPS mode, the device tracker 108 may (a) configure the boundaries of the proximity zones 110a, 110b, and 110c to correspond to the thresholds for the PEPS system, and (b) assign the frequency bands so that the outer most proximity zone 110c is associated with the lowest used frequency band and the inner most proximity zone 110a is associated with the highest used frequency band. As another example, in the RePA mode, the the device tracker 108 may (a) configure the boundaries of the proximity zones 110a, 110b, and 110c to correspond to the thresholds for the RePA system, and (b) assign the frequency bands so that the middle proximity zone 110b is associated with the highest used frequency band, while the outer most and the inner most proximity zones 110a and 110c are associated with lower frequency bands.

In some examples, the interval at which the device tracker 108 uses ToF measurements to acquire a fix on the location of the mobile device 102 is based on which proximity zone 110a, 110b, and 110c that the mobile device 102 is in. Generally, in such examples, the device tracker 108 establishes the interval to be more frequent the closer the mobile device 102 is to the vehicle 100. For example, when the mobile device 102 is in the third proximity zone 110c, the device tracker 108 may acquire a fix on the mobile device 102 using ToF measurements every 30 seconds. In some examples, the device tracker 108 establishes the interval based on which of the subsystem of the vehicle 100 are activated. For examples, the intervals may be different depending on whether the RePA system is activate and/or the PEPS system is activates. As such an example, when the RePA system is active, the intervals may be shorter than when just the PEPS system is active. Alternatively or additionally, in some examples, the interval at which the device tracker 108 uses ToF measurements to acquire a fix on the location of the mobile device 102 is based on the relative speed and/or trajectory of the mobile device with reference to the vehicle 100. For example, the device tracker 108 may acquire a fix of the mobile device 102 more frequently when the mobile device 102 is traveling quickly towards the vehicle 100. Alternatively in some examples, the device tracker 108 establishes the interval based on how close the mobile device 102 is to the outer boundaries of the proximity zones 110a, 110b, and 110c. For example, when the RePA system is active, the device tracker 108 make the interval shorter when as the mobile device 102 approaches the outer boundary of the outer most proximity zone 110c.

Because ToF measurements inherently have error, after acquiring a fix of the mobile device 102, the device tracker 108 determines a zone of probability 112 that represents an area that contains the location of the mobile device 102 taking into account the error in the estimation. That is, instead of representing a single location, the zone of probability represents a set of possible locations of the mobile device 102 based on the error in the ToF measurement. Because the different frequency bands have different amounts of error because of the differences in the available bandwidth, the zone of probability 112 is smaller the higher the frequency used to take the ToF measurement. Table (1) below shows example error rates associated with example frequency bands.

TABLE (1)

Example Error Rates for ToF Measurements

| Frequency Band | Worst Cast ToF Error |
|---|---|
| 2.4 GHz | 3 meters |
| 5.0 GHz | 1 meter |
| 60.0 GHz | 5 centimeters |

As shown in Table (1) above, using the 2.4 GHz frequency band, for example, the actual location of the mobile device 102 may be 3 meters from the estimated location. The device tracker 108 switches the frequency band when the edge of the zone of probability 112 closest to the vehicle 100 crosses into a different one of the proximity zones 110a, 110b, and 110c. As a result, as the mobile device 102 approaches the vehicle 100, the zone of probability 112 associated with the mobile device 102 becomes smaller.

In some examples, to switch frequency bands, the device tracker 108 sends a frequency change message (FREQ) to the mobile device 102 at the current frequency that indicates which frequency band the device tracker 108 will switch to. For example, if the device tracker 108 is going to switch the ToF measurement from the 2.4 GHz frequency band to the 5.0 GHz frequency band, the device tracker 108 may send the FREQ message at the 2.4 GHz frequency band. Alternatively, in some examples, the mobile device 102 monitors all of the possible frequency bands and sends an ACK message on the same frequency band that the REQ message was received from. For example, the mobile device 102 may monitor the 2.4 GHz, 5.0 GHz, and the 60.0 GHz frequency bands. In such an example, when the REQ message is received on the 5.0 GHz frequency band, the mobile device 102 may return the ACK message on the 5.0 GHz frequency band.

Between acquiring fixes using ToF measurements, the device tracker 108 uses dead reckoning to track the location of the zone of probability 112 associated with the mobile device 102. To perform dead reckoning, the device tracker 108 receives measurements from one or more inertial sensors (e.g., accelerometer, gyroscope, etc.). Using the speed and trajectory of the mobile device 102 as indicated by the measurements from the inertial sensors, the device tracker 108 tracks the location of the mobile device 102. In some examples, the device tracker 108 uses the center of the zone of probability 112 as the location that is being track via dead reckoning. Because dead reckoning also introduces error in location, the zone of probability 112 may become larger between fixes to account for this error.

FIGS. 1A, 1B, and 1C illustrate an example of the device tracker 108 tracking the mobile device 102 by varying the frequencies at which the ToF measurement is taken. While FIGS. 1A, 1B, and 1C illustrate the mobile device 102 approaching the vehicle 100 and the frequencies bands being used increasing in frequency as a result, the opposite also occurs. That is, as the mobile device 102 moves away from the vehicle 100, the frequencies bands (and thus the precision of tracking the mobile device 102) decrease in a similar manner. In the illustrated examples, the first distance (D1) may be 2.0 meters and the second distance (D2) may be 3.0 meters. In the illustrated example of FIG. 1A, the zone of probability 112 starts at position P1, which is in the third proximity zone 110c. In the third proximity zone 110c, the device tracker 108 uses the 2.4 GHz frequency band to acquire the fix on the mobile device 102. The device tracker 108 tracks the location of the zone of probability 112 using dead reckoning to position P2. At position P2, the edge of the zone of probability 112 intersects the boundary of the second proximity zone 110b. In the illustrated example of FIG. 1B, because the device tracker 108 switches to the 5.0 GHz frequency band, the device tracker 108 determines that the smaller zone of probability 112 is at position P3. The device tracker 108 tracks the location of the zone of probability 112 to position P4, wherein the edge of the zone of probability 112 intersects the boundary of the first proximity zone 110a. In FIG. 1C, the device tracker 108 switches to the 60.0 GHz frequency band. The device tracker 108 generates a smaller zone of probability 112 at this frequency band. The device tracker 108 uses dead reckoning to track the zone of probability 112 from position P5 to position P6.

Figure 2A:
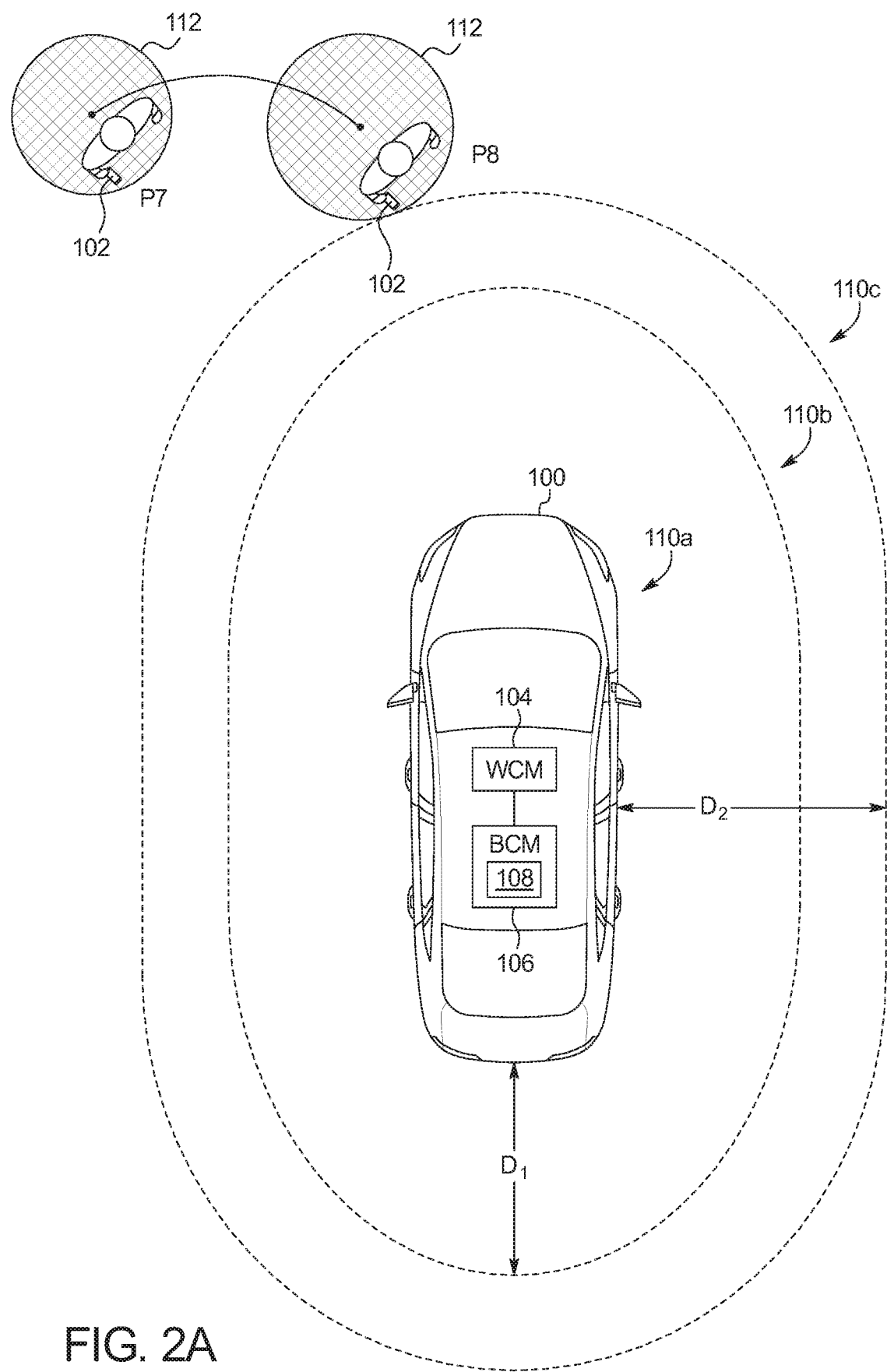
FIGS. 2A, 2B, and 2C illustrate a vehicle operating in a second vehicle mode.
Figure 2B:
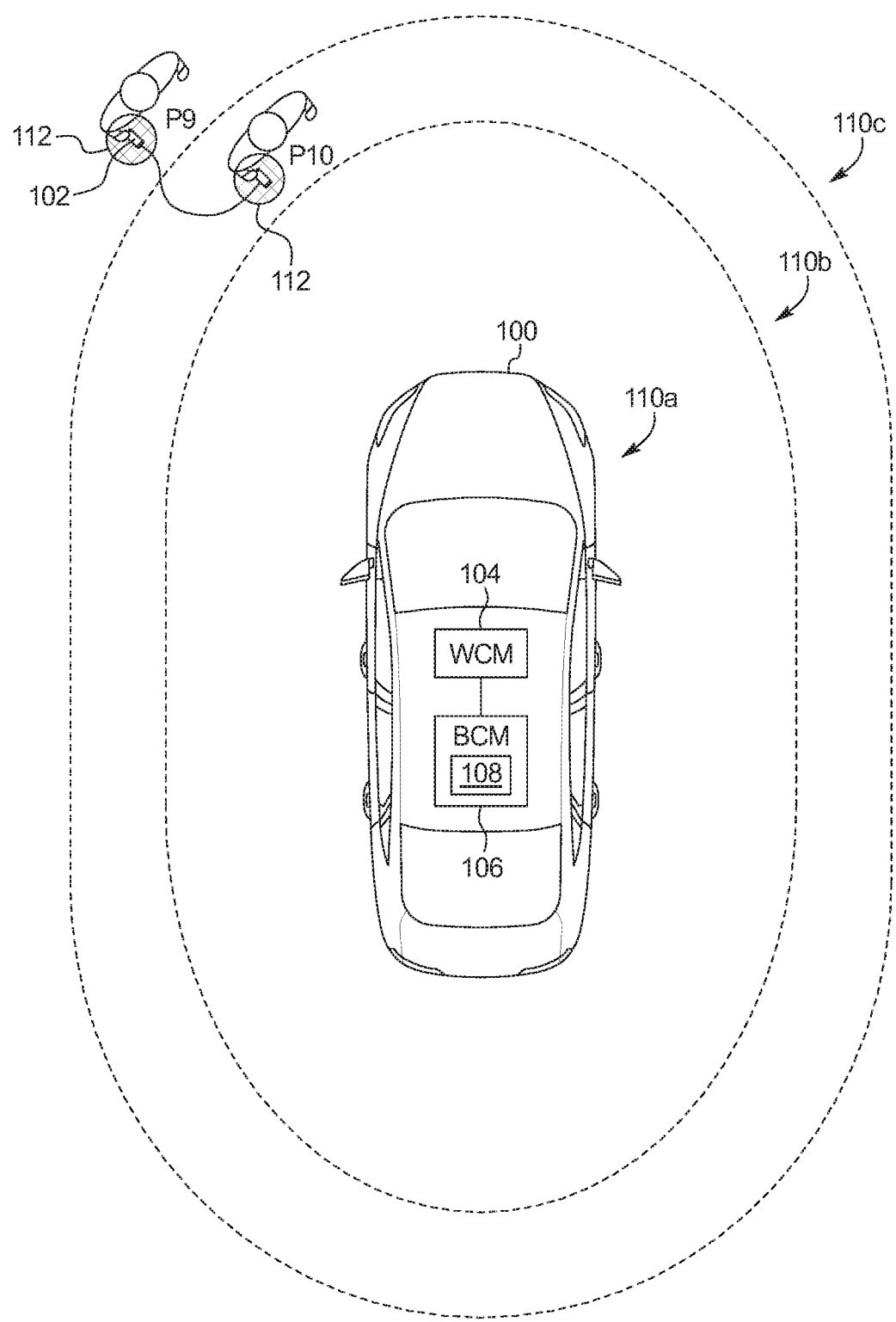
Figure 2C:
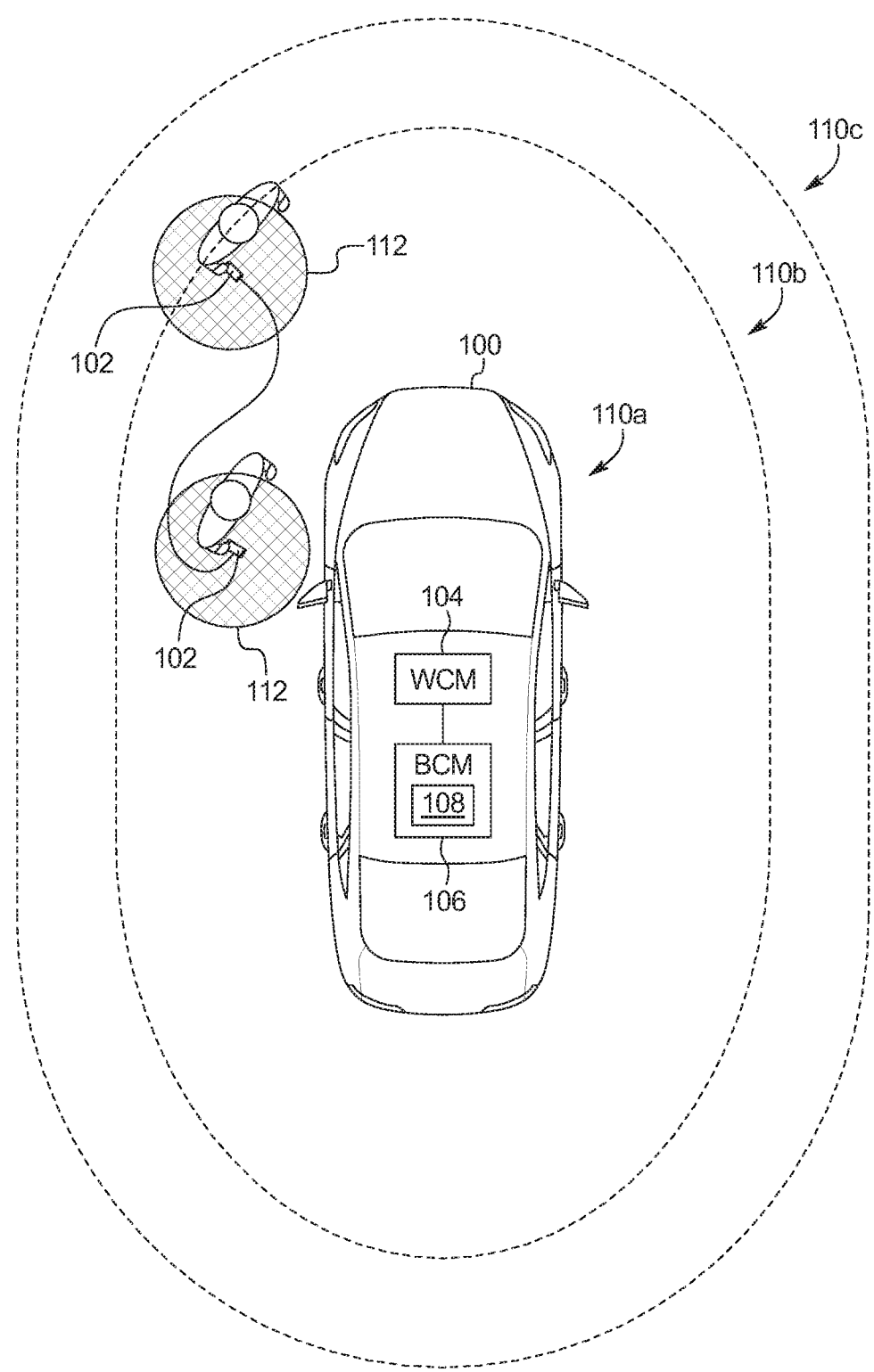

FIGS. 2A, 2B, and 2C illustrate an example of the device tracker 108 tracking the mobile device 102 by varying the frequencies at which the ToF measurement is taken. While FIGS. 2A, 2B, and 2C illustrate the mobile device 102 approaching the vehicle 100 and the frequencies bands being used increasing in frequency as a result, the opposite also occurs. That is, as the mobile device 102 moves away from the vehicle 100, the frequencies bands (and thus the precision of tracking the mobile device 102) change in a similar manner. In the illustrated examples, the first distance (D1) may be 5.5 meters and the second distance (D2) may be 6.0 meters. In the illustrated example of FIG. 2A, the zone of probability 112 starts at position P7, which is in the third proximity zone 110c. In the third proximity zone 110c, the device tracker 108 uses the 2.4 GHz frequency band to acquire the fix on the mobile device 102. The device tracker 108 tracks the location of the zone of probability 112 using dead reckoning to position P8. At position P8, the edge of the zone of probability 112 intersects the boundary of the second proximity zone 110b. In the illustrated example of FIG. 2B, because the device tracker 108 switches to the 60.0 GHz frequency band, the device tracker 108 determines that the smaller zone of probability 112 is at position P9. The device tracker 108 tracks the location of the zone of probability 112 to position P10, wherein the edge of the zone of probability 112 intersects the boundary of the first proximity zone 110a. In FIG. 2C, the device tracker 108 switches to the 5.0 GHz frequency band. The device tracker 108 generates a larger zone of probability 112 at this frequency band. The device tracker 108 uses dead reckoning to track the zone of probability 112 from position P11 to position P12.

FIG. 2 is a block diagram of electronic components 300 of the vehicle 100 of FIGS. 1A, 1B, and 1C. In the illustrated example, the electronic components includes the wireless control module 104, the body control module 106, and a vehicle data bus 302.

The body control module 106 includes a processor or controller 304 and memory 306. In the illustrated example, the body control module 106 is structured to include device tracker 108. Alternatively, in some examples, the device tracker 108 may be incorporated into another electronic control unit (ECU) (such as the wireless control module 104 or the autonomy unit, etc.) with its own processor and memory. The processor or controller 304 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 306 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 306 includes multiple kinds of memory, particularly volatile memory and non-volatile memory.

The memory 306 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 306, the computer readable medium, and/or within the processor 304 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 302 communicatively couples the wireless control module 104 and the body control module 106. In some examples, the vehicle data bus 302 includes one or more data buses. The vehicle data bus 302 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

In the illustrated example, the mobile device 102 includes inertial sensors 308 and multiple communication controllers 310. The inertial sensors 308 are devices that sense movement of the mobile device 102 to determine speed and trajectory of the mobile device 102. The inertial sensor 308 may, for example, be accelerometers and/or gyroscopes, etc. The communication controllers 310 communicate using the frequencies and the protocols of the wireless control module 104 of the vehicle 100. For example, the communication controllers 310 may communicate over the 2.4 GHz frequency band, the 5.0 GHz frequency band, and the 60.0 GHz frequencies band to facilitate communication (e.g., sending measurements from the inertial sensors 308) with the vehicle 100 and ToF measurements by the vehicle 100. For example, in response to receiving a request message (REQ) from the vehicle 100 at a certain frequency band, the communication controller 310 may return an acknowledge message (ACK) to the vehicle 100 at that frequency band.

Figure 4:
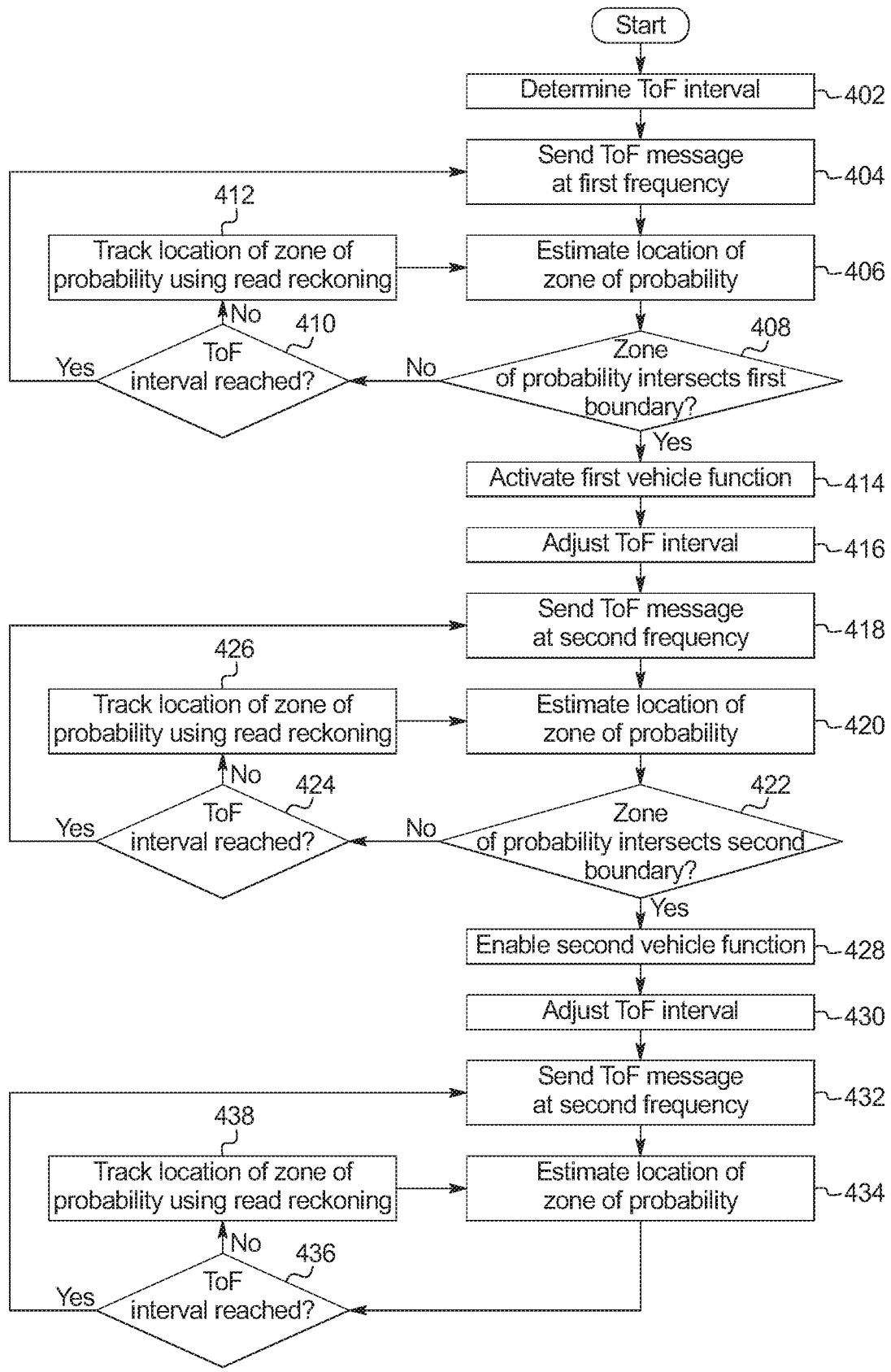
FIG. 4 is a flowchart of a method to control the vehicle of FIGS. 1A, 1B, 1C and 2A, 2B, 2C using localization based on variable time-of-flight and dead reckoning, which may be implemented by the electronic components of FIG. 3.

FIG. 4 is a flowchart of a method to control the vehicle 100 of FIGS. 1A, 1B, and 1C using localization based on variable time-of-flight and dead reckoning, which may be implemented by the electronic components 300 of FIG. 2. Initially, at block 402, the device tracker 108 determines a polling interval to the ToF measurements. In some examples, the interval is a default value (e.g., every 100 milliseconds, etc.). Alternatively, in some examples, the interval is based on a previous location relative to the vehicle 100 at which the mobile device 102 was measured. For example, when the last location measurement outside of the vehicle 100, the device tracker 108 may determine a first period (e.g., 100 milliseconds, etc.) and when the last location measurement was inside the vehicle 100, the device tracker 108 may determine may have a second period (e.g., every 10 milliseconds, etc.). That is, when the last location measurement was inside the vehicle 100, the device tracker 108 may assume that the mobile device 102 has recently exited the vehicle 100 and is thus close to the vehicle 100.

At block 404, the device tracker 108 sends the ToF message using a first frequency band. In some examples, the first frequency band is the 2.4 GHz frequency band. At block 406, the device tracker 108 estimates the location of the zone of probability 112 relative to the location of the vehicle 100. At block 408, the device tracker 108 determines whether the zone of probability 112 intersects a boundary between a third proximity zone 110c and a second proximity zone 110b. When the zone of probability 112 intersects the boundary, the method continues at block 414. Otherwise, when the zone of probability 112 does not intersect the boundary, the method continues at block 410. At block 410, the device tracker determines whether the polling interval has been reached. If the polling interval has been reached, the method returns to block 404. Otherwise, when the polling interval has not been reached, the method continues at block 412. At block 412, the device tracker 108 tracks the mobile device 102 using dead reckoning based on inertial sensor measurement data received from the mobile device 102.

At block 414, the device tracker 108 activates and/or enables a vehicle function. For example, the device tracker 108 may enable the RePA system to autonomously control the vehicle 100. At block 416, the device tracker 108 adjusts the polling interval. In some examples, the device tracker 108 sets the polling interval to be more frequent. At block 418, the device tracker 108 sends the ToF message using a second frequency band. In some examples, the second frequency band is the 5.0 GHz frequency band. At block 420, the device tracker 108 estimates the location of the zone of probability 112 relative to the location of the vehicle 100. At block 422, the device tracker 108 determines whether the zone of probability 112 intersects a boundary between the second proximity zone 110b and a first proximity zone 110a. When the zone of probability 112 intersects the boundary, the method continues at block 428. Otherwise, when the zone of probability 112 does not intersect the boundary, the method continues at block 424. At block 424, the device tracker determines whether the polling interval has been reached. If the polling interval has been reached, the method returns to block 418. Otherwise, when the polling interval has not been reached, the method continues at block 426. At block 426, the device tracker 108 tracks the mobile device 102 using dead reckoning based on inertial sensor measurement data received from the mobile device 102.

At block 428, the device tracker 108 activates and/or enables a vehicle function. For example, the device tracker 108 may prime one or more of the doors to unlock when a user is detected proximate a handle of the vehicle 100. At block 430, the device tracker 108 adjusts the polling interval. In some examples, the device tracker 108 sets the polling interval to be more frequent. At block 432, the device tracker 108 sends the ToF message using a third frequency band. In some examples, the third frequency band is the 60.0 GHz frequency band. At block 434, the device tracker 108 estimates the location of the zone of probability 112 relative to the location of the vehicle 100. At block 436, the device tracker determines whether the polling interval has been reached. If the polling interval has been reached, the method returns to block 432. Otherwise, when the polling interval has not been reached, the method continues at block 438. At block 438, the device tracker 108 tracks the mobile device 102 using dead reckoning based on inertial sensor measurement data received from the mobile device 102.

Figure 3:
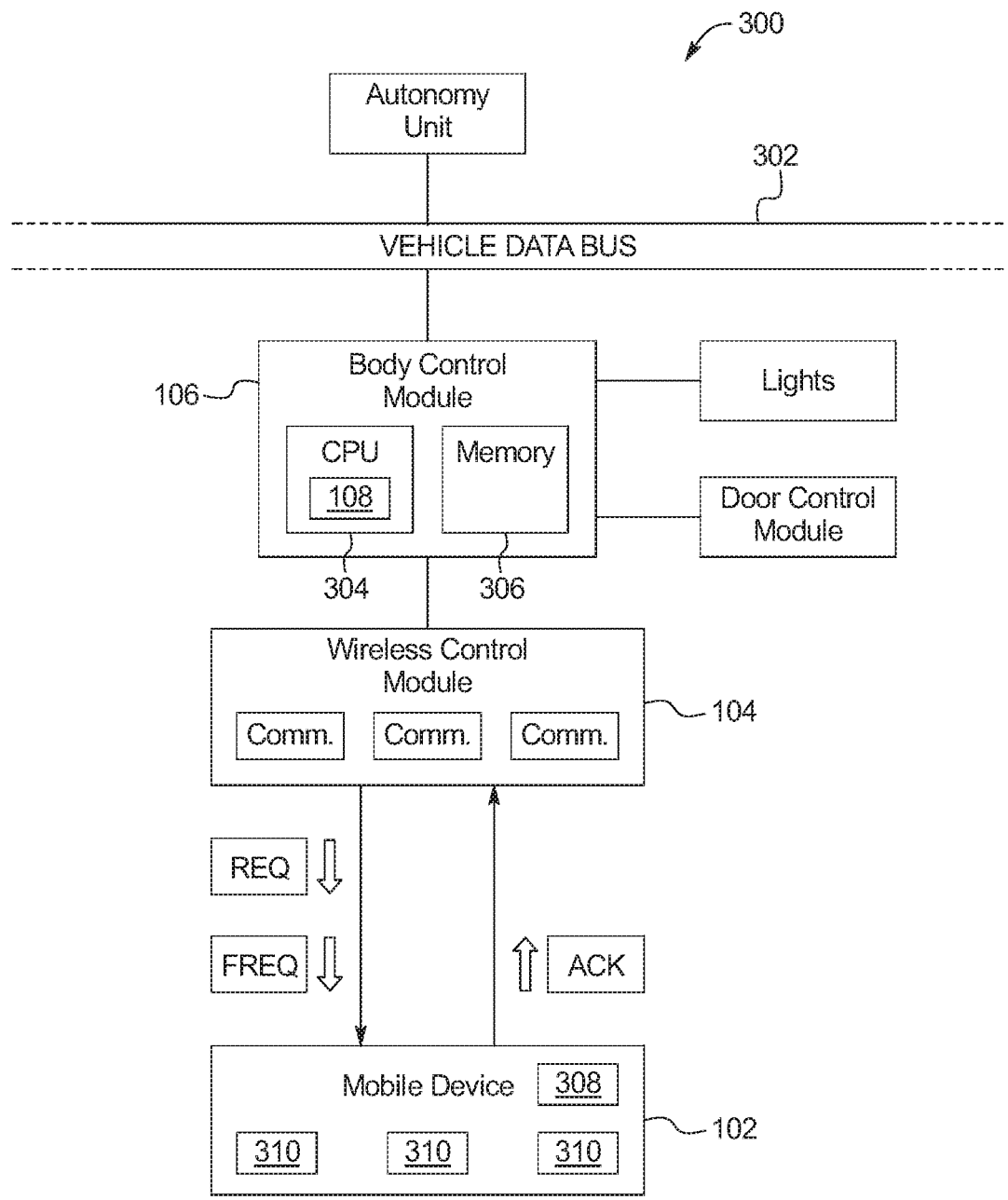
FIG. 3 is a block diagram of electronic components of the vehicle of FIGS. 1A, 1B, 1C and 2A, 2B, 2C.

The flowchart of FIG. 3 is representative of machine readable instructions stored in memory (such as the memory 306 of FIG. 2) that comprise one or more programs that, when executed by a processor (such as the processor 304 of FIG. 2), cause the vehicle 100 to implement the example device tracker 108 of FIGS. 1 and 2. Further, although the example program(s) is/are described with reference to the flowchart illustrated in FIG. 3, many other methods of implementing the example device tracker 108 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a wireless control module configured to communicate with a mobile device using multiple frequency bands; and
   a body control module configured to:
      at an interval, estimate a location of the mobile device relative to the vehicle based on time-of-flight measurements using one of the multiple frequency bands selected based on a previous location estimate;
      between intervals, track the location using dead reckoning; and
      control a subsystem of the vehicle based on the location.

2. The vehicle of claim 1, wherein the multiple frequency bands include a first frequency band and a second frequency band, the first frequency band including a higher set of frequencies than the second frequency band.

3. The vehicle of claim 2, wherein the body control module is configured to define a first proximity zone and a second proximity zone around the vehicle, the first proximity zone being closer to the vehicle than the second proximity zone.

4. The vehicle of claim 3, wherein when the previous location estimate is in the second proximity zone, the body control module is configured to, at the interval, estimate the location of the mobile device based on the time-of-flight measurements using the second frequency band.

5. The vehicle of claim 3, wherein when the previous location estimate is in the first proximity zone, the body control module is configured to, at the interval, estimate the location of the mobile device based on the time-of-flight measurements using the first frequency band.

6. The vehicle of claim 3, wherein the body control module is configured to, at the interval:
  when the previous location estimate is in the second proximity zone, estimate the location of the mobile device based on the time-of-flight measurements using the second frequency band; and
  when the previous location estimate is in the first proximity zone, estimate the location of the mobile device based on the time-of-flight measurements using the first frequency band.

7. The vehicle of claim 2, wherein the first frequency band is at 60.0 GHz and the second frequency band is one of 2.4 GHz or 5.0 GHz.

8. The vehicle of claim 1, wherein the body control module is configured to adjust the interval based on the previous location estimate.

9. The vehicle of claim 1, wherein the multiple frequency bands include a first frequency band, a second frequency band, and a third frequency band, the first frequency band including a higher set of frequencies than the second frequency band, and the second frequency band including a higher set of frequencies than the third frequency band.

10. The vehicle of claim 9, wherein the body control module is configured to define a first proximity zone, a second proximity zone, and a third around the vehicle, the first proximity zone being closer to the vehicle than the second proximity zone, and the second proximity zone being closer to the vehicle than a third proximity zone.

11. The vehicle of claim 10, wherein the body control module is configured to, at the interval:
  when the previous location estimate is in the third proximity zone, estimate the location of the mobile device based on the time-of-flight measurements using the third frequency band;
  when the previous location estimate is in the second proximity zone, estimate the location of the mobile device based on the time-of-flight measurements using the second frequency band; and
  when the previous location estimate is in the first proximity zone, estimate the location of the mobile device based on the time-of-flight measurements using the first frequency band.

12. The vehicle of claim 9, wherein the first frequency band is at 60.0 GHz, the second frequency band is at 5.0 GHz, and the third frequency band is at 2.4 GHz.

13. A method to control a vehicle comprising:
  at an interval, performing time-of-flight measurements of a signal between a vehicle and a mobile device using a frequency band selected based on a previous estimated location of the mobile device relative to the vehicle to obtain a fix on the mobile device;
  between intervals, based on the fix, performing dead reckoning on the mobile device using inertial sensor measurements received from the mobile device to estimate a current location of the mobile device; and
  controlling a subsystem of the vehicle based on the estimated current location of the mobile device.

14. The method of claim 13, wherein performing the time-of-flight measurements of the signal between the vehicle and the mobile device includes selecting one of a first frequency band or a second frequency band, the first frequency band including a higher set of frequencies than the second frequency band.

15. The method of claim 14, including defining a first proximity zone and a second proximity zone around the vehicle, the first proximity zone being closer to the vehicle than the second proximity zone.

16. The method of claim 15, including:
  when the previous location estimate is in the second proximity zone, selecting the second frequency band; and
  when the previous location estimate is in the first proximity zone, selecting the first frequency band.

17. The method of claim 13, wherein the first and second frequency bands are selected from a group of 900 MHz, 2.4 GHz, 5.0 GHz, and 60.0 GHz.

* * * * *